Oct. 7, 1952     A. W. GOLDSBARRY ET AL     2,613,176
FALLING FILM TYPE OF VACUUM STILL WITH ROTATING PARTIAL CONDENSER
Filed Dec. 26, 1947     2 SHEETS—SHEET 2

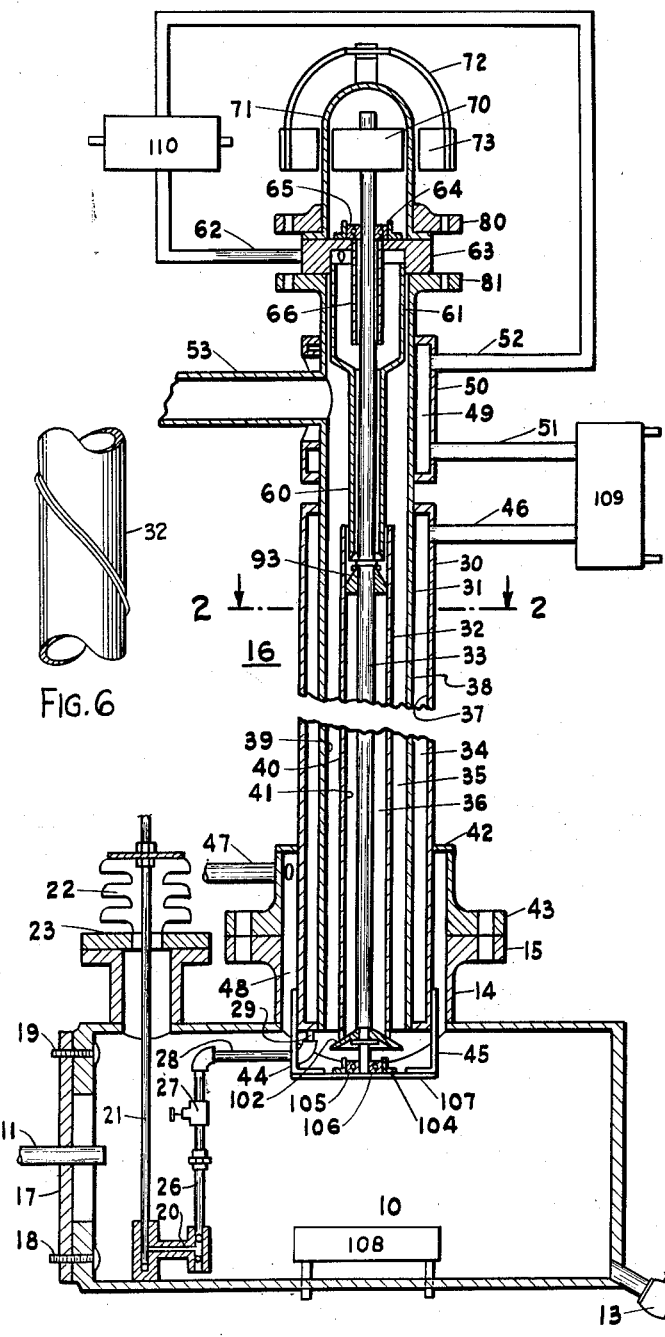

INVENTORS.
ALBERT W. GOLDSBARRY
BY MEYER S. AGRUSS

Edward H Lang
ATTORNEY

Patented Oct. 7, 1952

2,613,176

UNITED STATES PATENT OFFICE 2,613,176

FALLING FILM TYPE OF VACUUM STILL WITH ROTATING PARTIAL CONDENSER

Albert W. Goldsbarry, Northbrook, and Meyer S. Agruss, Chicago, Ill., assignors to The Pure Oil Company, Chicago, Ill., a corporation of Ohio Application December 26, 1947, Serial No. 793,896

3 Claims. (Cl. 202—153)

This invention relates to an improved apparatus for the distillation and fractionation at a reduced pressure of complex mixtures of liquids and solids capable of being liquefied upon heating, such as hydrocarbon mixtures comprising petroleum.

More particularly, the apparatus comprises centrifugal equipment for fractional distillation of a mixture of high molecular weight oils and waxes of the type encountered in the lubricating oil processing art, where the material is spread into a thin film and subjected to centrifuging while it is distilled under reduced pressure and maintained in counter-current contact with vapors thereof.

It is a fundamental object of the invention to provide an improved falling film type distilling apparatus for the sharp fractionation of liquid mixtures, arranged for the continuous heating, fractionation and condensation of the fluid during the distillation thereof.

A second object of the invention is to provide a unitary structure for the distillation of fluids in which the fluid condensate is subjected to centrifugal force and the heat input is efficiently utilized and conserved.

Another object is to provide an apparatus and method for obtaining improved fractionation of oil mixtures otherwise difficult to distill without cracking.

A further object of the invention is to provide means for using the liquid being distilled as a heat transfer medium for heating the column, in which operation the liquid is circulated to effect the requisite heating and cooling of the evaporating and condensing surfaces which are coaxially arranged in the column.

Other objects and advantages of the invention will in part be obvious and in part appear hereinafter.

The invention comprises a fractionating column enclosing a condenser for employment with a still, which column includes a series of coaxially arranged cylindrical members providing annular passages for distillate vapor, condensate, feed and heating medium, so that circulation of heating fluid through an annular space in the column will accomplish the heating necessary for the distillation. The apparatus is also arranged to permit the circulation of some relatively cool fluid through the innermost condensing portion of the column to provide for condensation of some of the product. The apparatus thus comprises a falling film type of column employing a centrally disposed, rotatable, partial condenser which is cooled by the falling film flowing over the interior surface of said condenser, as a consequence of which condensate collects on the outer surface thereof and is centrifugally flung to the hot outer column wall, where revaporization of said condensate takes place, there being obtained by this action sharp fractions of liquid mixtures, particularly when the distillation is carried out at reduced pressures.

One embodiment of the invention is illustrated in the accompanying drawings in which:

Figure 1 is a longitudinal section through the apparatus showing the arrangement of tubular members to define the coaxial annular spaces in which the distillation is carried out;

Figure 2 is a section through the apparatus taken at the level of line 2—2 in Figure 1;

Figure 3:
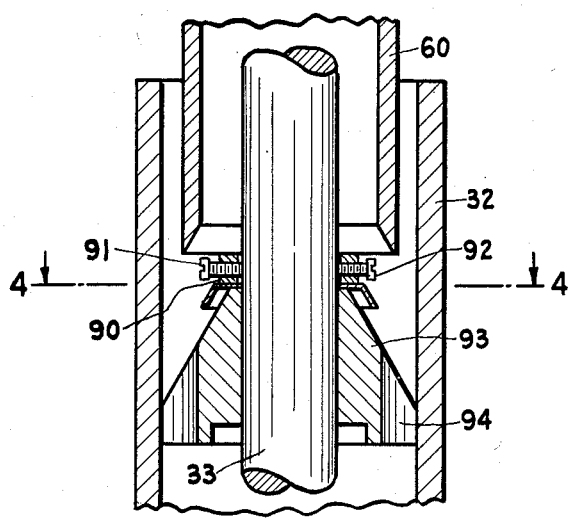
Figure 3 is an enlarged longitudinal section of the upper portion of the rotating condenser showing a detail of the condensing tube support.

Figures 6, 7, and 8 are enlarged partial section views of tube 32 showing spiral, circumferential, and longitudinal corrugations on the external surface thereof.

In Figure 1 where there is shown a preferred embodiment of the invention, 10 represents the still pot having an inlet 11 and an outlet 12, controlled by a valve 13. Liquid to be distilled is retained in the pot while being heated to furnish vapors to the apparatus. The heating can be accomplished by electrical or other heating means 108 to supplement such pre-heating of the fluid as may be carried out in external heating apparatus. Extension 14 on pot 10 terminating in flange 15 constitutes an exit for vapors and serves the purpose of receiving and holding fractionating tower 16 on the pot.

The pot 10 is provided at a convenient section thereof with a cover plate 17 held in place by bolts 18 and 19 over an opening through which access to the interior of the pot can be had. For the purpose of circulating heated fluid through the apparatus to accomplish heating and condensing in the fashion desired, the pot 10 is also equipped with an internally disposed pump 20 which is driven from the outside by means of a shaft 21 which is brought into the pot 10 through a bellows 22 supported on a flange 23. The driving unit used to operate the pump should be selected to suit the load and material being distilled.

Liquid which is in the pot submerges the pump and on each delivery stroke thereof, liquid passes from the pump 20 into line 26, controlled by valve 27, and line 28 for feeding into the fractionating tower at junction point 29.

The fractionating tower 16 comprises three coaxially arranged cylinders 30, 31 and 32, which are supported together with shaft 33 to define heating medium annulus 34, vapor annulus 35, and condensing liquid annulus 36. The inner surface 37 of the tube 30 and outer surface 38 of tube 31 define the heating liquid annulus 34; similarly, vapor annulus 35 is defined by the inner surface 39 of tube 31 and the outer surface 40 of tube 32. An annular passage for cooling liquid is defined by the inner surface 41 of tube 32 and the shaft 33. The entire assembly is supported on flange 15 with collar 42 integrally joined to tube 30 and terminating in flange 43 to match flange 15 on the still pot, which, in the final assembly, are bolted together with a sealing gasket therebetween. Supports 44 and 45 maintain the several tubes in proper alignment.

Tubes 30 and 31 are connected together at their lower extremities and at the upper extremity of tube 30 to define annular space 34 for heating fluid, which is admitted by conduit 28 and is led out by conduit 46.

An inlet oil feed pipe 47 is located above the large flange 15 to pass oil feed into the annular space 48 which opens into the still and is defined by the collar 42, flange 43, extension 14, flange 15 and tube 30.

The internal pump 20 transfers the hot contents of the still directly to the annular space 34 which is between the outermost and the second tube as shown in the drawing. This space, it will be noted, does not extend completely to the top of the column, but ends shortly above the top of tube 32. A separate annular space 49 defined by tube 31 and tube 50, surrounds the upper portion of the column, and receives oil from outlet pipe 46 which is circulated therethrough by way of conduits 51 and 52. According to the demands of the distillation being conducted, liquid in passing from space 34 to 49 may be heated or cooled. Suitable heat exchange means as illustrated by heat exchanger 109 may be employed for this purpose. When the oil emerges from this second annular space, it may again be adjusted in temperature by suitable heat exchange means 110 before it is passed to the group of conduits feeding the interior of the rotating partial condenser.

The annular space 35 defined by tubes 31 and 32 constitutes a vapor space in direct communication with the still pot 10 through which vapors generated in the pot rise and find their way to conduit 53 to pass to a total condenser, not a part of the fractionating apparatus shown. Conduit 53 also provides for connection to a pump for evacuating the apparatus.

Tube 32 and shaft 33 define a third annular space 36 which is the cooling liquid space for making the outer surface 40 of tube 32 a condensing and revaporizing surface, as will be explained in greater detail in the description of the operation of the apparatus. Tube 32 terminates near the upper portion of the apparatus and telescopes with a narrower tube 60, which in turn enlarges in diameter at its upper end to define a housing 61 around the upper portion of shaft 33. The housing receives cooling liquid through conduit 62 so that it can flow down the inner surfaces of tubes 60 and 32 in the form of a film. Surmounting the housing for the admission of cooling liquid is support 63 holding bearing races 64, 65 and skirt 66 for aligning the shaft and guiding cooling liquid.

The upper end of shaft 33 connects with a source of motive power, such as permanent magnet 70 in non-magnetic enclosure 71 which supports a frame 72 carrying an additional permanent magnet 73 to provide motive power for the shaft. The use of a pair of magnets, one driven, to provide power for rotating the shaft and inner tube is merely suggested, for other drive mechanisms which will furnish desired speeds of rotation are adequate. As can be seen, the assembly is supported on the upper end of the column by flange 81 and the several concentric tubes are supported in alignment with the outer tube 30 by means of fixed connections and by connecting flanges 80 and 81 together with bolts. A sealing gasket is included between members 63 and 71 and 81.

In Figure 3, where there is shown in detail the telescoping arrangement of tubes, central shaft 33 and tubes 32 and 60 are shown and identified. Tube 60 is shown with a beveled lower edge which serves to promote smooth flow of liquid film thereover. Below the upper end of tube 32, a small collar 90 and set screws 91 and 92 hold a pyramidal distributing piece 93 in position on the shaft. The piece, which may be integral with tube 32 or merely closely fitted therein, has a plurality of orifice-defining cuts 94 arranged around its periphery so that liquid flowing as a film over the inner surface of tube 60 and down through the annulus defined by shaft 33 and tube 32 will be distributed over the pyramid and pass out through the orifices and down over the inner surface of tube 32 as a film.

Figure 4:
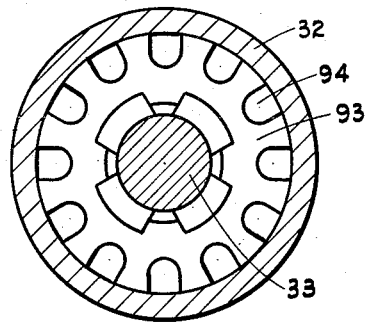
Figure 4 is an enlarged section of the apparatus taken on the line 4—4 of Figure 3 to show detail.

Figure 4 shows a plan view of the pyramidal piece taken at the level corresponding to line 4—4 in Figure 3.

Figure 5:
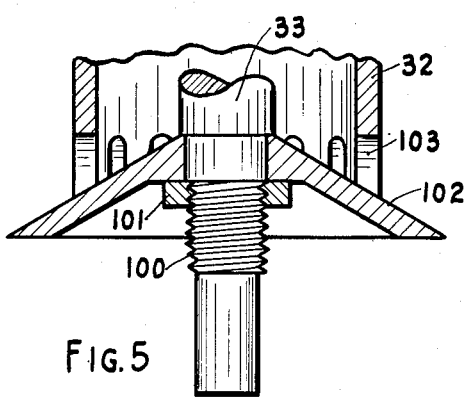
Figure 5 is an enlarged sectional view of the bottom of the condensing tube support to show detail thereof.

Figure 5 is an enlarged section of the lower termination of the shaft 33 and support for tube 32. Essentially, this portion of the apparatus is a threaded section 100 which will receive a nut 101 for locking an umbrella member 102 in place, which member is locked or integrally joined with the end of tube 32. Around the periphery of the tube 32 there is a series of slots 103 which defines orifices in cooperation with the umbrella section.

Shaft 33 terminates at the level of supports 44 and 45 for the shaft 33 and is held in place by bearing 104 including races 105 and 106 and plate 107, as shown in Figure 1.

In operation, the arrangement is such that central shaft 33 can be rotated at a controlled rate of speed through a very wide range to apply centrifugal force to the film of liquid condensate on the outer surface of tube 32. Application of motive power to frame 72 and magnet 73 will cause corresponding rotation of magnet 70 and shaft 33.

In performing a distillation, the mixture to be fractionated is charged through conduit 11 to the still 10 where it is initially heated under a selected reduced pressure to a temperature sufficient to cause boiling to begin, whereupon, by means of internally positioned pump 20, the charge is circulated first to the annular space 34 in the column 16, which is a wall heater space. The liquid flows out of the heater space through conduit 46 and, thereafter, through a cooling coil if it is desired to lower the temperature thereof.

From the annulus 34, the heating liquid passes to the upper annular heater space 49 through conduit 51, after which it passes out through conduit 52 and through another coil for adjustment of its temperature in the desired direction. The liquid is then passed through line 62 into the upper end of the interior of the rotating partial condenser comprising tubes 32 and 60, where it passes downwardly through the rotating member as a falling film whereby it picks up heat from the vapors generated in the still and rising in space 35. After passing through the condenser, the liquid emerges from the lower end of the rotating member as a spray formed over member 102 to contact directly the vapors in the still before rejoining the main body of oil at a temperature substantially that of the vapors rising therefrom. The main body of oil having been subjected to a selected temperature-pressure relationship which induces continuous and sustained evaporation at the desired rate, and the cycling of the still charge having been continued at the desired and controlled flow-rate necessary to effect properly the completion of its fractionation, the distillation is accomplished under a state of dynamic equilibrium, while the heat content of the fluid is maintained or progressively raised as demanded by the progress of the fractional distillation.

The course of liquid through the apparatus during the distillation in a typical case would be as follows:

Pre-heated feed would enter through conduit 11 or conduit 47 to join the body of liquid maintained in the still pot 10. Pump 20 forces liquid through lines 26 and 28 to annular wall heating space 34, from which the liquid emerges through conduit 46 to go through a cooling or heating coil, depending upon the temperature adjustment desired, to enter conduit 51, circulate through heating space 49, and emerge through conduit 52. From this point, the liquid, again depending upon the temperature adjustment desired, can pass through a cooling or heating zone to be fed into conduit 62, which is the entry point for cooling liquid for the rotating condenser. The liquid accumulates in the housing 61 to a moderate level and passes down through the interior of tube 60 as a layer on the interior surface thereof, to be spread onto the interior surface of tube 32, which is the active rotating condenser portion of the apparatus. The cooling liquid emerges from the bottom of tube 32 as a spray to rejoin the main body of liquid in the pot.

Similarly, the course of vapors is readily traced through the apparatus, for vapors generated within the apparatus rise and pass up through the annular space 35 where they are heated by the liquid in the outer wall heating space 34 and cooled by the surface of rotating condenser 32. The continuous contact of these vapors with these two surfaces results in the condensation of some vapor on the surface of tube 32 and its separation therefrom by centrifugal force to be thrown across the annular space through the rising vapors to contact the interior wall 39 of tube 31, where the liquid is re-heated and re-vaporized to pass through the cycle again. Thus, it can be seen that in the passage through the vapor space, liquid will be vaporized, condensed and re-vaporized a number of times to accomplish a sharp fractionation thereof. Those vapors which finally reach the top of the column pass out through line 53 for total condensation.

If it is desired, the outer surface of rotating tube 32 can be made circumferentially, spirally, or longitudinally corrugated to provide a greater surface area and to assist in breaking up the descending film of condensate to throw it on to the heated column wall. This is shown in Figures 6, 7, and 8 wherein these corrugations are shown in the form of ribs. Since tube 32 is adapted to expose an efficient heat transfer surface, it is desirable that the corrugations shown in Figures 6, 7, and 8 do not add to the tube wall thickness. Thus, the entire wall structure of tube 32 may be corrugated so that the inner surface is also furrowed or corrugated.

It should be noted that the course of the heating liquid applied to the double wall column may be varied for the liquid being distilled can be pumped from a pre-heater into the heating annulus or taken directly from the pot into the column jacket and thence, if cool enough, into the interior or the rotating part of the condenser. The particular route selected for the circulation of the liquid through the heating-cooling cycle is optional, for it can readily be seen that variations thereof can be worked out.

Though the description of the invention has been confined to a single specific embodiment of the invention, it should be apparent that certain changes may be made in the construction and different embodiments of the invention could be made without departing from the scope thereof. It is intended, therefore, that all matter contained in the above description, or shown in the accompanying drawing, shall be interpreted as illustrative and not in a limiting sense.

What is claimed is:

1. A fractionating column comprising a plurality of concentrically supported conduits defining a plurality of annuli, a central shaft rotatably supporting at least the innermost one of said conduits, rotational driving means connected to said shaft, cooling liquid conduit means in telescopic relationship with the inner portion of the upper end of said innermost concentric conduit, cooling liquid dispersion means within the top of said innermost concentric conduit providing a falling film of cooling liquid on the inner surface of said innermost conduit, circumferential ports along the bottom periphery of said innermost concentric conduit, a supporting and cooling liquid dispersing means attached to the lower portion of said shaft and impinging in supporting relationship on the bottom periphery of said innermost conduit, the concentric arrangement of the innermost conduit and the surrounding one defining a vapor space, means for introducing vapors into the bottom of said vapor space, the two concentric conduits next adjacent to said innermost conduit being joined adjacent their lower ends to define a liquid holding space, means to charge liquid to said space, said supporting and cooling liquid dispersing means being adjacent the point of entry of vapors into said vapor space and said last mentioned dispersing means being positioned to cooperate with said ports to discharge liquid from said space into the path of ascending vapors entering the bottom of said vapor space.

2. A fractionating column comprising inner, intermediate and outer conduits concentrically arranged and supported, wherein the inner conduit has circumferential ports in its lower periphery and is supported by a central rotatable shaft having at least two coniform liquid dispersing means attached thereto, and the lowermost of said coniform liquid dispersing means being also the means of support for said inner conduit at its circumferentially ported periphery, the intermediate conduit is supported and joined with said outer conduit to form an outer annulus, the inner and intermediate conduits being in fixed spaced relationship to define an annular vapor space, means for introducing vapors into the bottom of said vapor space, means for rotating said shaft and inner conduit, conduit means for introducing liquid to be distilled into the interior of said inner conduit to cool the surface thereof, means for passing heating liquid through the annulus formed by said intermediate and said outer conduits, said lowermost coniform dispersing means being positioned to cooperate with said circumferential ports to discharge liquid to be distilled into the path of said vapors entering the bottom of said vapor space.

3. A falling film distilling column comprising an inner, intermediate and outer conduit concentrically arranged, said intermediate and outer conduits being joined adjacent their lower ends to form a heating liquid holding annulus, means to charge liquid to said liquid annulus, said inner and intermediate conduits being held in fixed space relationship to define a vapor annulus, means to charge vapors to be fractionated into the bottom of said vapor annulus, said inner conduit terminating below the top of said outer conduit and having circumferential ports along its bottom periphery, a central rotatable shaft extending the length of said column, said shaft supporting said inner conduit by means of a coniform cooling liquid-dispersing means attached to the bottom of said shaft and impinging in supporting relationship on said bottom periphery, cooling liquid conduit means in telescopic relationship with the inner portion of the upper end of said inner conduit, said conduit means being flared into a cooling liquid reservoir at its upper end concentric with said shaft and forming a restricted liquid annulus between its inner surface and said shaft, a second coniform cooling liquid-dispersing means attached to said shaft within said inner conduit in contact with the inner surface thereof below its upper terminus and below the lower end of said cooling liquid conduit means, said second dispersing means having ports along its outer periphery to provide passage for a falling liquid film from said liquid annulus and disperse same on the inner surface of said inner conduit when under the influence of centrifugal force.

ALBERT W. GOLDSBARRY.
MEYER S. AGRUSS.

REFERENCES CITED

The following references are of record in the file of this patent:

UNITED STATES PATENTS

| Number | Name | Date |
|---|---|---|
| 2,040,837 | D'Yarmett | May 19, 1936 |
| 2,169,601 | Cornelius | Aug. 15, 1939 |
| 2,202,008 | Ittner | May 28, 1940 |
| 2,224,621 | Voorhees | Dec. 10, 1940 |
| 2,333,712 | Eckey | Nov. 9, 1943 |
| 2,403,978 | Hickman | July 16, 1946 |
| 2,427,594 | Deny | Mar. 9, 1948 |
| 2,539,699 | Perry et al. | Jan. 30, 1951 |

FOREIGN PATENTS

| Number | Country | Date |
|---|---|---|
| 595,096 | Great Britain | Nov. 26, 1947 |
| 595,142 | Great Britain | Nov. 27, 1947 |
| 596,392 | Great Britain | Jan. 2, 1948 |

OTHER REFERENCES

Byron et al.: "A Universal Rectifying Column," American Chemical Society, Abstracts of Papers, 108th Annual Meeting, Sept. 11 to 15, 1944, Division of Petroleum Chemistry, pages 1–0 and 2–0.

Birch et al.: "Spinning Band Column," Feb. 1947, Journal of Soc. of Chemistry.

Morse: "High Vacuum Technology," Ind. & Eng. Chem., Sept. 1947, vol. 39, No. 9.